(12) United States Patent
Toyoda et al.

(10) Patent No.: US 10,058,925 B2
(45) Date of Patent: Aug. 28, 2018

(54) SIALON SINTERED BODY AND CUTTING INSERT

(71) Applicant: NGK SPARK PLUG CO., LTD., Nagoya-shi, Aichi (JP)

(72) Inventors: Ryoji Toyoda, Kakamigahara (JP); Fumihiro Kikkawa, Inazawa (JP); Atsushi Komura, Kiyosu (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 15/514,963

(22) PCT Filed: Sep. 29, 2015

(86) PCT No.: PCT/JP2015/077440
§ 371 (c)(1),
(2) Date: Mar. 28, 2017

(87) PCT Pub. No.: WO2016/052468
PCT Pub. Date: Apr. 7, 2016

(65) Prior Publication Data
US 2017/0216931 A1 Aug. 3, 2017

(30) Foreign Application Priority Data

Sep. 29, 2014 (JP) ................. 2014-198478

(51) Int. Cl.
*C04B 35/505* (2006.01)
*B23B 27/14* (2006.01)
(Continued)

(52) U.S. Cl.
CPC ........ *B23B 27/148* (2013.01); *C04B 35/1115* (2013.01); *C04B 35/18* (2013.01);
(Continued)

(58) Field of Classification Search
CPC .......................... C01B 21/0826; C04B 35/597
See application file for complete search history.

(56) References Cited

U.S. PATENT DOCUMENTS

| 4,818,635 A | 4/1989 | Ekstrom et al. |
| 5,110,773 A * | 5/1992 | Corral ................. C01B 21/0826 423/327.1 |

(Continued)

FOREIGN PATENT DOCUMENTS

| JP | 60-239365 A | 11/1985 |
| JP | 2008-162882 A | 7/2008 |

(Continued)

OTHER PUBLICATIONS

International Search Report dated Nov. 24, 2015, issued by the International Searching Authority in counterpart International Application No. PCT/JP2015/077440 (PCT/ISA/210).

(Continued)

Primary Examiner — Noah S Wiese
(74) Attorney, Agent, or Firm — Sughrue Mion, PLLC

(57) ABSTRACT

A sialon sintered body and a cutting insert each having thermal shock resistance and VB wear resistance. The sialon sintered body and the cutting insert contain β-sialon and 21R-sialon and exhibit an X-ray diffraction peak intensity ratio $[(I_{21R}/I_A) \times 100]$ of 5% or greater and smaller than 30%, wherein $I_A$ represents the sum of the peak intensities of the sialon species, and $I_{21R}$ represents the peak intensity of 21R-sialon, the ratio being calculated from the peak intensities of the sialon species obtained by using X-ray diffractometry.

6 Claims, 1 Drawing Sheet

(51) Int. Cl.
*C04B 35/111* (2006.01)
*C04B 35/18* (2006.01)
(52) U.S. Cl.
CPC .... *C04B 35/505* (2013.01); *B23B 2200/0461* (2013.01); *C04B 2235/3225* (2013.01); *C04B 2235/9607* (2013.01)

(56) References Cited

U.S. PATENT DOCUMENTS

| | | | | |
|---|---|---|---|---|
| 5,200,374 | A | * | 4/1993 | Yamada ................ C04B 35/597 501/98.2 |
| 2004/0155225 | A1 | * | 8/2004 | Yamada ................ C04B 35/597 252/301.4 R |
| 2006/0178256 | A1 | | 8/2006 | Yeckley |
| 2006/0240971 | A1 | | 10/2006 | Yeckley |
| 2008/0167174 | A1 | | 7/2008 | Osthols |
| 2010/0039020 | A1 | * | 2/2010 | Hirosaki ................ C04B 35/581 313/483 |
| 2012/0066981 | A1 | | 3/2012 | Nakayama et al. |
| 2016/0207837 | A1 | | 7/2016 | Toyoda et al. |

FOREIGN PATENT DOCUMENTS

| | | |
|---|---|---|
| JP | 2008-529948 A | 8/2008 |
| JP | 2013-224240 A | 10/2013 |
| WO | 2010/103839 A1 | 9/2010 |
| WO | 2015/097856 A1 | 7/2015 |

OTHER PUBLICATIONS

Olsson, P. et al., "Sinterability and Microstructure of La-Containing Sialon Materials", Structural Ceramics—Processing, Microstructure and Properties 11th RISO International Symposium on Metallurgy and Materials Science, 1990, pp. 433-438 (Total 13 pages).

* cited by examiner

SIALON SINTERED BODY AND CUTTING INSERT

TECHNICAL FIELD

The present invention relates to a sialon sintered body and to a cutting insert.

BACKGROUND ART

Sintered sialon is known to be a chemically stable material, having high mechanical strength within a temperature range from room temperature to high temperature and high hardness which are superior to those of silicon nitride. Thus, sialon sintered bodies find a wide range of uses, such as machine parts, heat-resistant parts, and wear-resistant parts. One use of such a sialon sintered body is a cutting insert, which is attached to a cutting tool in use thereof (see, for example, Patent Documents 1 to 5). A cutting insert is a cutting edge to be removably attached to the tip of the main body of a cutting tool and serves as a tool part which is also called a throw-away chip, a cutting edge-replaceable chip, or the like.

PRIOR ART DOCUMENTS

Patent Documents

Patent Document 1: Japanese Patent Application Laid-Open (kokai) No. 2008-162882
Patent Document 2: Japanese Patent Application. Laid-Open (kokai) No. 2013-224240
Patent Document 3: WO 2010/103839A1
Patent Document 4: Japanese Patent Application Laid-Open (kokai) No. 1985-239365
Patent Document 5: Japanese Patent PCT (kohyo) Publication No. 2008-529948

SUMMARY OF THE INVENTION

Problem to be Solved by the Invention

Meanwhile, in cutting a work material such as a heat-resistant alloy by means of a cutting insert, cutting inserts having different characteristics are generally employed in rough machining and semi-finish machining. However, switching the cutting insert is a cumbersome operation for workers. Therefore, if one can complete steps from rough machining to semi-finish machining by means of one unique cutting insert, switching of a cutting tool during the cutting procedure is not necessary. As a result, the time required for cutting can be reduced, and the cutting operation can be simplified. In addition, the risk for misuse of the cutting tool can be minimized.

Under such circumstances, the present inventors have investigated to provide a cutting insert which can be employed in a cutting procedure from rough machining to semi-finish machining. In rough machining, when a work material is surface-processed by means of a cutting tool to which a plurality of cutting inserts are attached in a circumferential manner as shown in, for example, FIG. 2 (such a process being called milling), some of the cutting inserts may be cracked by heat, resulting in breakage of them in some cases. In milling, heat is intermittently generated between each cutting insert and the work material due to friction therebetween, and the temperature of the portion of the cutting insert which comes into contact with the work material (hereinafter, the temperature is referred to as "cutting temperature") varies. In this case, conceivably, the change in volume of the cutting insert (expansion and contraction) repeatedly occurs, to thereby easily induce thermal cracking. Thus, the cutting insert for use in roughening is desired to have thermal shock resistance. In contrast, the cutting insert for use in finishing is desired to provide cut surfaces having excellent surface properties. When the cutting insert receives severe VB wear, cutting resistance increases, whereby properties of cut surfaces may be impaired, and hardening after working may occur. Therefore, the cutting insert for use in finishing is desired to have VB wear resistance.

Thus, an object of the present invention is to provide a sialon sintered body and a cutting insert each having thermal shock resistance and VB wear resistance.

Means for Solving the Problem

One mean for solving the aforementioned problems is the following sialon sintered body.

[1] A sialon sintered body containing β-sialon and 21R-sialon, characterized in that the sialon sintered body exhibits an X-ray diffraction peak intensity ratio [$(I_{21R}/I_A) \times 100$] of 5% or greater and smaller than 30%, wherein $I_A$ represents the sum of the peak intensities of the sialon species, and $I_{21R}$ represents the peak intensity of 21R-sialon, the ratio being calculated from the peak intensities of the sialon species obtained by using X-ray diffractometry; and the sialon sintered body has thermal expansion coefficient of 4.2 ppm/K or less in a range of room temperature to 600° C.

[2] A sialon sintered body as described in [1] above, wherein

β-sialon represented by $Si_{6-Z}Al_ZO_ZN_{8-Z}$ has a Z value of 0.3 to 1.0;

the sintered body contains at least one rare earth element B selected from the group consisting of La and Ce, and at least one rare earth element C selected from the group consisting of Y, Nd, Sm, Eu, Gd, Dy, Er, Yb, and Lu;

the mole ratio of rare earth element B to rare earth element C as oxides, $M_B:M_C$, is 1.0:0.06 to 1.0:5.0; and the sialon sintered body contains the rare earth element B and the rare earth element C in a total amount, as oxides, of 0.8 mol % to 4.0 mol %.

[3] A sialon sintered body as described in [1] or [2] above, which exhibits an X-ray diffraction peak intensity ratio [$(I_\alpha/I_A) \times 100$] of 0% to 25%, wherein $I_A$ represents the sum of the peak intensities of the sialon species, and $I_\alpha$ represents the peak intensity of α-sialon, the peak intensities of the sialon species being obtained by using X-ray diffractometry.

[4] A sialon sintered body as described in [3] above, wherein in α-sialon represented by $M_x(Si,Al)_{12}(O,N)_{16}$ (0<x≤2), M represents metallic elements including the rare earth element B and the rare earth element C; and the sialon sintered body has a ratio $A_\alpha/A_S$ of 70% or smaller, wherein $A_S$ represents the atomic ratio of rare earth element B to rare earth element C, and $A_\alpha$ represents the atomic ratio of rare earth element B to rare earth element C in α-sialon.

[5] A sialon sintered body as described in any one of [1] to [4] above, wherein the sialon sintered body contains 21R-sialon, and 12H-sialon and/or 15R-sialon among polysialon species including 21R-sialon, 12H-sialon, and 15R-sialon, and the sialon sintered body exhibits an X-ray diffraction peak intensity ratio [$(I_p/I_A) \times 100$] of 50% or smaller, wherein $I_A$ represents the sum of the peak intensities of the sialon species, the peak intensities of the sialon species being obtained by using X-ray diffractometry, and $I_p$ represents the sum of the peak intensities of poly-type sialon species, the peak intensities of the poly-sialon species being obtained by using X-ray diffractometry.

[6] A cutting insert formed of a sialon sintered body as recited in any one of [1] to [5].

Effects of the Invention

The sialon sintered body according to the present invention has thermal shock resistance and VB wear resistance. The cutting insert according to the present invention is formed of a sialon sintered body having thermal shock resistance and VB wear resistance. Thus, in cutting a work material such as a heat-resistant alloy, the cutting insert can exhibit sufficient cutting performance for a long period of time during rough machining and semi-finish machining. According to the present invention, there can be provided a cutting insert ensuring long service life, which cutting insert can be employed in rough machining and semi-finish machining carried out in cutting a work material such as a heat-resistant alloy.

MODES FOR CARRYING OUT THE INVENTION

Figure 1:
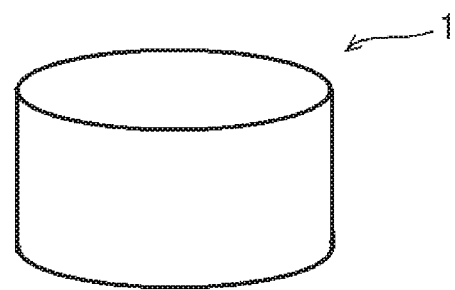
FIG. 1 is a schematic view of an embodiment of the cutting insert of the present invention.

The sialon sintered body of the present invention contains β-sialon and 21R-sialon.

Generally, β-sialon is in acicular form. Thus, when a sialon sintered body contains a large amount of β-sialon, a crystallographic structure in which needle-like crystal grains assemble together at random is formed, whereby progress in cracking of the sialon sintered body due to external stress is suppressed. In other words, the higher the β-sialon content of the sialon sintered body, the higher the thermal shock resistance of the sialon sintered body.

In contrast, 21R-sialon is generally in columnar form. Thus, differing from the case of β-sialon, a crystallographic structure in which needle-like crystal grains assemble together at random fails to be formed. As compared with β-sialon, 21R-sialon exhibits less an effect of improving thermal shock resistance. Instead, 21R-sialon exhibits excellent resistance to chemical reaction with a work material such as a heat-resistant alloy, whereby melting and diffusion the work material is prevented. Therefore, when the sialon sintered body contains 21R-sialon, VB wear resistance of the sintered body can be enhanced. Meanwhile, 21R-sialon is a poly-type sialon. The sialon sintered body of the present invention contains β-sialon and 21R-sialon and may contain additional poly-type sialon(s); i.e., 12H-sialon and/or 15R-sialon. Similar to 21R-sialon, 12H-sialon and 15R-sialon are in columnar form and have excellent resistance to chemical reaction. Among these poly-type sialon species, 21R-sialon has particularly high aspect ratio and resistance to progress in cracking. Thus, conceivably, 21R-sialon can enhance VB wear resistance and thermal shock resistance.

The sialon sintered body of the present invention exhibits an X-ray diffraction peak intensity ratio [$(I_{21R}/I_A) \times 100$] of 5% or greater and smaller than 30%, wherein $I_A$ represents the sum of the peak intensities of the sialon species, and $I_{21R}$ represents the peak intensity of 21R-sialon, the ratio being calculated from the peak intensities of the sialon species obtained by using X-ray diffractometry. The peak intensity ratio is preferably 8% to 27%, more preferably 10% to 25%. Since the sialon sintered body of the present invention contains β-sialon and 21R-sialon and has the aforementioned ratio [$(I_{21R}/I_A) \times 100$] of 5% or greater and smaller than 30%, preferably 8% to 27%, more preferably 10% to 25%, the sialon sintered body has both thermal shock resistance and VB wear resistance. The ratio [$(I_{21R}/I_A) \times 100$] serves as an index for the 21R-sialon content of the sialon sintered body. When the ratio [$(I_{21R}/I_A) \times 100$] is smaller than 5%, the 21R-sialon content of the sialon sintered body is low, failing to satisfactorily attain the effect of 21R-sialon on improving VB wear resistance and thermal shock resistance. As a result, the sialon sintered body exhibits poor VB wear resistance and thermal shock resistance. When the ratio [$(I_{21R}/I_A) \times 100$] is 30% or higher, the thermal shock resistance of the sialon sintered body is impaired. A possible reason for this is that an increase in 21R-sialon content of the sialon sintered body facilitates formation of 21R-sialon coarse grains, thereby reducing the strength of the sintered body.

The ratio [$(I_{21R}/I_A) \times 100$] can be measured through the following procedure. Firstly, each sialon sintered body sample is subjected to X-ray diffractometry (XRD). The peak intensity of each sialon measured in the X-ray diffractometry is a peak height at a 2θ value as specified below. In the case of each sialon other than 21R-sialon, the maximum peak intensity specified in the JCPDS is employed as a peak intensity of the sialon species, while a peak intensity other than the maximum peak intensity specified in the JCPDS is employed as a peak intensity of 21R-sialon. In the case of 21R-sialon, the peak intensity obtained in X-ray diffractometry is normalized to the peak height values of other sialons through multiplying the peak intensity by 2.5, to thereby obtain the peak intensity $I_{21R}$ employed in the calculation. Also, when peaks attributed to a sialon other than the below-specified sialon species are identified, a peak which does not overlap with peaks attributed to other sialons is selected, on the basis of comparison of the X-ray diffraction chart and the JCPDS card. When the thus-selected peak is not a maximum peak, the peak intensity $I_x$ is obtained through multiplying the selected peak by an appropriate value for adjustment.

Peak intensity of β-sialon $I_β$:peak height (peak height attributed to (1,0,1) plane of β-sialon) at approximately 2θ=33.4°

Peak intensity of 21R-sialon (formula: $SiAl_6O_2N_6$) $I_{21R}$: 2.5×peak height (2.5× peak height attributed to (1,0,10) plane of 21R-sialon) at approximately 2θ=37.6°

Peak intensity of 12H-sialon (formula: $SiAl_5O_2N_5$) $I_{12H}$: peak height (peak height attributed to (0,0,12) plane of 12H-sialon) at approximately 2θ=32.8°

Peak intensity of 15R-sialon (formula: $SiAl_4O_2N_4$) $I_{15R}$: peak height (peak height attributed to (0,0,15) plane of 15R-sialon) at approximately 2θ=32.0°

Peak intensity of α-sialon $I_α$:peak height (peak height attributed to (2,0,1) plane of α-sialon) at approximately 2θ=30.8°

As described above, the ratio [$(I_{21R}/I_A) \times 100$] is obtained by calculating the sum of the X-ray diffractometry peak intensities of the sialon species $I_A$ (=$I_β+I_α+I_{12H}+I_{15R}+I_{21R}+I_x$) and dividing the peak intensity of 21R-sialon $I_{21R}$ by the sum of peak intensities of the sialon species $I_A$.

The sialon sintered body of the present invention preferably has a thermal expansion coefficient in a range of room temperature to 600° C. of 4.2 ppm/K or less. When the thermal expansion coefficient in a range of room temperature to 600° C. is 4.2 ppm/K or less, excellent thermal shock resistance can be attained. In one mode of use of the cutting insert formed of the sialon sintered body of the present invention (i.e., the cutting insert made of the sialon sintered body of the present invention), the cutting insert is attached to a cutting tool for use in milling (e.g., a cutting tool to which a plurality of cutting inserts are attached in a circumferential manner as shown in, for example, FIG. 2). When a work material is subjected to face machining or the like through rotation of such a cutting tool, heat is intermittently generated between each cutting insert and the work material due to friction therebetween. In this case, the cutting temperature of the portion of the cutting insert which comes into contact with the work material varies within a temperature range of 600° C. or narrower. Due to variation on cutting temperature, the change in volume of the cutting insert (expansion and contraction) repeatedly occurs, to thereby induce thermal cracking. In contrast, when the cutting insert has a thermal expansion coefficient in a range of room temperature to 600° C. of 4.2 ppm/K or less, the change in volume of the cutting insert (expansion and contraction), which would otherwise be caused by variation in cutting temperature, can be reduced, whereby thermal cracking is prevented. In other words, a cutting insert having a thermal expansion coefficient of 4.2 ppm/K or less has excellent thermal shock resistance and ensures long service life. Thus, particularly, a cutting insert for employment in milling preferably has a thermal expansion coefficient in a range of room temperature to 600° C. of 4.2 ppm/K or less.

The thermal expansion coefficient of the sialon sintered body in a range of room temperature (25° C.) to 600° C. may be measured in accordance with JIS R 1618 (at a temperature elevation rate of 10° C./min under nitrogen atmosphere).

The sialon sintered body of the present invention preferably has a thermal conductivity at room temperature of 7 W/k·m or higher. The thermal conductivity is generally 15 W/k·m or lower. When the thermal conductivity at room temperature is 7 W/k·m or higher, and the sialon sintered body of the present invention is employed as a cutting insert, heat generated during cutting a work material can be readily discharged, and variation in cutting temperature, which would otherwise occur particularly in milling, can be reduced, whereby thermal cracking is prevented. In other words, a cutting insert having a thermal conductivity of 7 W/k·m or higher has excellent thermal shock resistance and ensures long service life. Thus, particularly, a cutting insert for employment in milling preferably has a thermal conductivity of 7 W/k·m or higher.

The thermal conductivity of the sialon sintered body at room temperature (25° C.) may be measured in accordance with JIS R 1611.

β-sialon is represented by a formula $Si_{6-Z}Al_ZO_ZN_{8-Z}$, and the Z value is preferably 0.3 to 1.0, more preferably 0.6 to 0.9. When the Z value is 0.3 to 1.0, preferably 0.6 to 0.9, the produced sialon sintered body exhibits further enhanced thermal shock resistance and VB wear resistance. The greater the Z value (i.e., the larger the amount of Al forming solid solution with β-sialon), the less the possibility of chemical reaction of β-sialon with a work material (e.g., heat-resistant alloy). As a result, wear of the sialon sintered body in a chemical process is suppressed, to thereby enhance VB wear resistance. Also, when β-sialon forms with a solid solution with Al, ionic bonds in β-sialon are enhanced, and interatomic distance increases. Thus, the larger the amount of Al forming solid solution with β-sialon, the more brittle the particles of β-sialon. As a result, the mechanical strength and the thermal shock resistance of β-sialon particles decrease. In addition, when the amount of Al forming solid solution with β-sialon increases, the form of β-sialon is changed from acicular to columnar, whereby the aspect ratio of the particles decreases. As a result, formation of a crystallographic structure in which needle-like crystal grains assemble together at random is impeded, and resistance to progress in cracking of the sialon sintered body decreases, whereby thermal shock resistance decreases. Therefore, when the Z value is in excess of 1.0, in the case where a cutting insert is formed of the sialon sintered body, the thermal shock resistance required for rough machining (milling) of heat-resistant alloy may fail to be obtained. When the Z value is smaller than 0.3, in the case where a cutting insert is formed of the sialon sintered body, reactivity of the sialon sintered body with a work material (e.g., heat-resistant alloy) increases, whereby VB wear resistance may decrease. Therefore, when the Z value is smaller than 0.3, VB wear resistance required for semi-finish machining may fail to be attained.

The Z value (Z) can be measured through the following procedure. Firstly, the a-axis lattice constant of β-sialon in the sialon sintered body is measured at a depth from the surface to 1 mm or more by using X-ray diffractometry. The measurement and the a-axis lattice constant of β-silicon nitride (7.60442 Å) are input to the following formula (1):

$$Z=(a-7.60442)/0.0297 \quad (1).$$

The sialon sintered body of the present invention preferably contains at least one rare earth element B selected from the group consisting of La and Ce, and at least one rare earth element C selected from the group consisting of Y, Nd, Sm, Eu, Gd, Dy, Er, Yb, and Lu. The rare earth element B and the rare earth element C contained in the sialon sintered body is generally originating from raw material powders of the sialon sintered body. When the raw material powders of the sialon sintered body contain only rare earth element C, formation of α-sialon is promoted, whereas when the raw material powders of the sialon sintered body contain only rare earth element B, sinterability decreases, to thereby impede formation of a sialon sintered body having high density. Even though sintering is possible, poly-type sialon species are readily formed. In this case, formation of β-sialon is relatively impeded, to thereby possibly reduce thermal shock resistance. In contrast, when the raw material powders of the sialon sintered body contain both rare earth elements B and C, formation of α-sialon is prevented during production of the sialon sintered body through sintering, to thereby facilitate formation of β-sialon and 21R-sialon. The sialon sintered body preferably contains La as rare earth element B. La can form acicular β-sialon more easily than Ce, whereby a crystallographic structure in which needle-like crystal grains assemble together at random is more easily formed. The sialon sintered body preferably contains, as rare earth element C, at least one species selected from the group consisting of Y, Dy, and Er. These rare earth elements can enhance sinterability through addition even in small amounts.

In the sialon sintered body of the present invention, the mole ratio of rare earth element B to rare earth element C as oxides, $M_B:M_C$, is preferably 1.0:0.06 to 1.0:5.0, more preferably 1.0:0.1 to 1.0:3.0. In other words, the mole ratio of rare earth element C to rare earth element B, $M_C/M_B$, is preferably 0.06 to 5.0, more preferably 0.1 to 3.0. When the mole ratio $M_B:M_C$, as oxides, is 1.0:0.06 to 1.0:5.0, particularly 1.0:0.1 to 1.0:3.0, β-sialon and 21R-sialon are readily formed through sintering at desired contents, whereby a sialon sintered body having excellent thermal shock resistance and VB wear resistance can be provided. When the mole ratio $M_C/M_B$ is smaller than 0.06, sinterability decreases, to thereby impede formation of a sialon sintered body having high density. Even though sintering is possible, the formed sialon sintered body may exhibit poor thermal shock resistance. When the mole ratio $M_C/M_B$ is greater than 5.0, formation of α-sialon is promoted during sintering, and formation of 21R-sialon is impeded. As a result, thermal shock resistance may be impaired. Even though 21R-sialon is formed, when the mole ratio $M_C/M_B$ is in excess of 5.0, formation of crystals having a garnet-type crystal structure at the grain boundary phase is promoted. In this case, the formed sialon sintered body tends to be brittle. When such a sialon sintered body is employed as a cutting insert, thermal shock resistance may be poor.

The sialon sintered body preferably contains the rare earth element B and the rare earth element C in a total amount, as oxides, of 0.8 mol % to 4.0 mol %, more preferably 1.0 mol % to 3.0 mol %. When the total amount, as oxides, is 0.8 mol % to 4.0 mol %, particularly 1.0 mol % to 3.0 mol %, β-sialon and 21R-sialon are readily formed at desired contents during sintering. As a result, a dense sialon sintered body having excellent thermal shock resistance and VB wear resistance can be provided. When the total amount, as oxides, is smaller than 0.8 mol %, sinterability decreases, and a dense sialon sintered body may fail to be produced. Even though sintering is possible, difficulty is encountered in formation of acicular β-sialon. In this case, a crystallographic structure in which needle-like crystal grains assemble together at random may fail to be formed. Thus, the formed sialon sintered body may have reduced thermal shock resistance. When the total amount, as oxides, is greater than 4.0 mol %, segregation of the grain boundary phase is promoted. As a result, the sialon sintered body may have reduced strength and impaired thermal shock resistance. Also, when the total amount, as oxides, is greater than 4.0 mol %, rare earth elements B and C which have not been dissolved in sialon remain in large amounts at the grain boundary phase. In this case, soft grain boundary phase portions tend to be formed. Thus, the formed sialon sintered body may have impaired thermal shock resistance.

The rare earth element B content of the sialon sintered body, the rare earth element C content thereof, and the total amount thereof may be measured by using X-ray fluorometry or chemical analysis.

Preferably, the sialon sintered body of the present invention contains no α-sialon or contains α-sialon in a specific amount. Generally, α-sialon has a spherical grain morphology. Thus, when the α-sialon content of the sialon sintered body increases, the sialon sintered body is more brittle and has lower thermal shock resistance. In contrast, as the α-sialon content of the sintered body increases, the hardness of the body increases, and VB wear resistance can be readily enhanced. Thus, the sialon sintered body of the present invention preferably exhibits an X-ray diffraction peak intensity ratio $[(I_\alpha/I_A) \times 100]$ of 0% to 25%, more preferably 3% to 15%, wherein $I_A$ represents the sum of the peak intensities of the sialon species, and $I_\alpha$ represents the peak intensity of α-sialon, the peak intensities of the sialon species being obtained by using X-ray diffractometry. When the ratio $[(I_\alpha/I_A) \times 100]$ is 0% to 25%, particularly 3% to 15%, a sialon sintered body having further enhanced thermal shock resistance and VB wear resistance can be provided. The ratio $[(I_\alpha/I_A) \times 100]$ serves as an index for α-sialon content of the sialon sintered body. When the ratio $[(I_\alpha/I_A) \times 100]$ is in excess of 25%, VB wear resistance is enhanced, but thermal shock resistance tends to decrease.

As described above, the ratio $[(I_\alpha/I_A) \times 100]$ may be obtained by calculating the sum of the X-ray diffractometry peak intensities of the sialon species $I_A$ ($=I_\beta+I_\alpha+I_{12H}+I_{15R}+I_{21R}+I_X$) and dividing the peak intensity of α-sialon $I_\alpha$ by the sum of peak intensities of the sialon species $I_A$.

When the sialon sintered body of the present invention has an α-sialon peak $I_\alpha$ relative intensity $[(I_\alpha/I_A) \times 100]$ of 0% to 25%, in α-sialon represented by $M_x(Si,Al)_{12}(O,N)_{16}$ (0<x≤2), M is preferably metallic elements including the rare earth element B and the rare earth element C; and the sialon sintered body has a ratio $A_\alpha/A_S$ of 70% or smaller, wherein $A_s$ represents the atomic ratio of rare earth element B to rare earth element C, and $A_\alpha$ represents the atomic ratio of rare earth element B to rare earth element C in α-sialon.

When the α-sialon peak $I_\alpha$ relative intensity $[(I_\alpha/I_A) \times 100]$ is 0% to 25%, the sialon sintered body having a ratio $A_\alpha/A_S$ of 70% or smaller exhibits enhanced thermal shock resistance and VB wear resistance. Rare earth element B, having a large ionic radius, is known to not form an interstitial solid solution with α-sialon by itself. However, by adding both rare earth elements B and C to the raw material powders of the sialon sintered body, the site which can receive a rare earth element is slightly expanded upon formation of an interstitial solid solution of α-sialon with rare earth element C. As a result, an interstitial solid solution of α-sialon with rare earth element B can be formed. In an interstitial solid solution of α-sialon containing both rare earth elements B and C, grain release is less likely to occur, as compared with the case of an interstitial solid solution of α-sialon containing only rare earth element C. Thus, such an interstitial solid solution of α-sialon containing both rare earth elements B and C exhibits excellent thermal shock resistance. In addition, bonding strength at the interface between the grain boundary phase and α-sialon can be further enhanced, when the ratio $A_\alpha/A_S$ is 70% or smaller (i.e., when the atomic ratio of rare earth element B to rare earth element C in α-sialon is smaller than the atomic ratio of rare earth element B to rare earth element C in the entirety (i.e., ≤70%)), and the ratio of forming an interstitial solid solution of α-sialon with rare earth element B is small. As a result, grain release is further prevented, to thereby attain excellent thermal shock resistance.

The rare earth element B content of α-sialon and the rare earth element C content of α-sialon may be measured by means of an element analyzer (EDS) attached to a transmission electron microscope.

The sialon sintered body of the present invention contains at least 21R-sialon among polysialon species including 21R-sialon, 12H-sialon, and 15R-sialon, and may further contain 12H-sialon and/or 15R-sialon, other than 21R-sialon. When the sialon sintered body of the present invention contains 21R-sialon with 12H-sialon and/or 15R-sialon, the sialon sintered body preferably exhibits an X-ray diffraction peak intensity ratio $[(I_p/I_A) \times 100]$ of 5% to 50%, more preferably 7% to 40%, still more preferably 10% to 30%, wherein $I_A$ represents the sum of the peak intensities of the sialon species, the peak intensities of the sialon species being obtained by using X-ray diffractometry, and $I_p$ represents the sum of the peak intensities of poly-type sialon species, the peak intensities of the poly-sialon species being obtained by using X-ray diffractometry. The ratio $[(I_p/I_A) \times 100]$ serves as an index for poly-type sialon species content of the sialon sintered body. When the sialon sintered body of the present invention contains, in addition to 21R-sialon, 12H-sialon and/or 15R-sialon at the above proportions, the sialon sintered body exhibits thermal shock resistance and VB wear resistance. When the ratio $[(I_p/I_A)\times 100]$ is smaller than 5%, the 21R-sialon content of the sialon sintered body is smaller than 5%. In this case, the effect of 21R-sialon on enhancing VB wear resistance and thermal shock resistance cannot fully be attained. As a result, VB wear resistance and thermal shock resistance are unsatisfactory. When the ratio $[(I_p/I_A)\times 100]$ is in excess of 50%, particularly in excess of 60%, the poly-type sialon content of the sialon sintered body is higher, and the β-sialon content becomes relatively lower. In this case, thermal shock resistance may be unsatisfactory.

As described above, the ratio $[(I_p/I_A)\times 100]$ may be obtained by calculating the sum of the X-ray diffractometry peak intensities of the sialon species $I_A$ $(=I_\beta+I_\alpha+I_{12H}+I_{15R}+I_{21R}+I_X)$ and the sum of the X-ray diffractometry peak intensities of the poly-type sialon species $I_P$ $(=I_{12H}+I_{15R}+I_{21R})$, and dividing the sum of the peak intensities of poly-type sialon species $I_P$ by the sum of peak intensities of the sialon species $I_A$.

The sialon sintered body of the present invention preferably contains sialon species consisting of α-sialon and poly-type sialons including β-sialon and 21R-sialon in a total amount with respect to the sialon sintered body of 70 area % to 99 area %, more preferably 85 area % to 97 area %. When the sialon sintered body contains the above sialon species in the above total amount, the sialon sintered body positively exhibits the characteristics of the above sialon species. In addition to the above sialon species, the sialon sintered body of the present invention may further contain a hard carbide, nitride, or carbonitride such as SiC, TiN, TiCN, TiC, or WC. The sialon species contained in the sialon sintered body in the above-specified amounts are usually present in the form of crystal grains having an aspect ratio of about 1 to about 20 (short axis diameter: submicrons to some microns) in the sialon sintered body. A grain boundary phase which is amorphous or partially crystalline is present between crystal grains. The grain boundary phase serves as a liquid phase during sintering to form the sialon sintered body, and enhances sinterability of the raw material to form the sialon sintered body.

The ratio of the total amount of sialon species with respect to the sialon sintered body may be obtained through the following procedure. Firstly, the target sialon sintered body is cut along an arbitrary plane, and the cut surface is mirror-polished. The polished surface is observed under a scanning electron microscope at a magnification of 2,000 to 5,000. The thus-obtained photograph of the microstructure is subjected to image analysis, whereby the areas attributed to sialon species are isolated from the phase other than those. The area of each of the two portions is measured. The relative total area attributed to the sialon species can be calculated by dividing the area attributed to sialon species by the area of the photograph.

The sialon sintered body of the present invention has thermal shock resistance and VB wear resistance. That is, in cutting a work material such as a heat-resistant alloy, the cutting insert formed of the sialon sintered body of the present invention can exhibit sufficient cutting performance for a long period of time during rough machining and semi-finish machining. Particularly, in milling, the cutting insert formed of the sialon sintered body of the present invention can exhibit sufficient cutting performance for a long period of time during rough machining and semi-finish machining.

Next, one mode of the method for producing the sialon sintered body of the present invention will be described. Firstly, powders containing a sialon-forming element such as α-$Si_3N_4$ powder, $Al_2O_3$ powder, and AlN powder; at least one member of $La_2O_3$ powder and $CeO_2$ powder serving as powders of rare earth element B oxides; and at least one member of $Y_2O_3$ powder, $Nd_2O_3$ powder, $Sm_2O_3$ powder, $Eu_2O_3$ powder, $Gd_2O_3$ powder, $Dy_2O_3$ powder, $Er_2O_3$ powder, $Yb_2O_3$ powder, and $Lu_2O_3$ powder serving as powders of rare earth element C oxides are mixed together, to thereby prepare a raw material powder. Notably, α-$Si_3N_4$ powder is treated with an acid such as hydrofluoric acid, to thereby remove oxide layers (e.g., silicon oxide ($SiO_x$) layers), so as to regulate the oxygen content to lower than 1.0 mass %. As a result, formation of 21R-sialon in the sialon sintered body can be facilitated. Alternatively, 21R-sialon may be used instead of AlN, and a corresponding hydroxide may be used instead of the oxide. In use, the raw material powder preferably has a mean particle size of 5μ or less, more preferably 3μ or less, still more preferably 1μ or less. The blending proportions of the components may be determined in consideration of the composition of the formed sialon sintered body after sintering.

Then, the thus-prepared raw material powder, a micro-wax-type organic binder dissolved in ethanol, and ethanol are put into a pot made of $Si_3N_4$, and the raw material powder is mixed under wet conditions by means of $Si_3N_4$ balls, to thereby prepare a slurry. The slurry is sufficiently dried and press-molded into a shape as desired. The thus-formed compact is dewaxed in a heater at 1 atm ($N_2$) and 400 to 800° C. for 60 to 120 minutes. The thus-dewaxed compact is heated in a sagger made of $Si_3N_4$ under nitrogen at 1,700 to 1,900° C. for 120 to 360 minutes, to thereby obtain a sialon sintered body. In the case where the formed sialon sintered body has a theoretical density lower than 99%, the sialon sintered body is further subjected to an HIP process under nitrogen at 1,000 atm and 1,500 to 1,700° C. for 120 to 240 minutes, to thereby obtain a dense sintered body having a theoretical density of 99% or higher.

Figure 2:
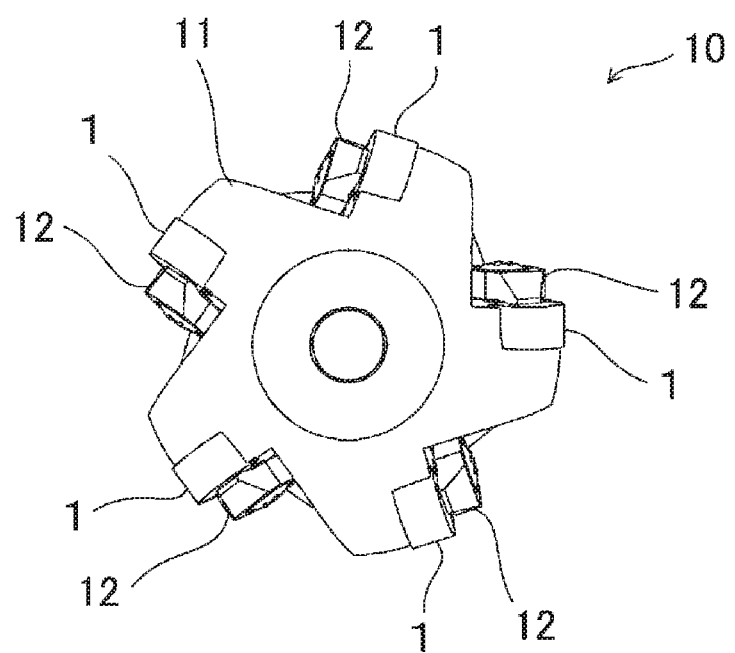
FIG. 2 is a schematic view of an embodiment of a cutting tool provided with the cutting insert shown in FIG. 1.

The sialon sintered body of the present invention may be employed as a cutting insert. FIG. 1 is a schematic view of an embodiment of the cutting insert of the present invention. FIG. 2 is a schematic view of an embodiment of a cutting tool provided with the cutting inserts falling within the scope of the present invention. As shown in FIG. 1, a cutting insert 1 of the embodiment has a generally cylindrical shape and is attached to a milling cutter holder 11 or the like, to thereby provide a cutting tool 10. The milling cutter holder 11 is provided with a plurality of attaching portions 12 arranged in a circumferential manner. Each cutting insert 1 is removably attached to a corresponding attaching portion 12. The cutting tool 10 is employed in milling or a similar working process of a work material (e.g., heat resistant alloy). As shown in FIG. 2, the cutting inserts 1 formed of the sialon sintered body of the present invention; i.e., the cutting insert 1 formed of the sialon sintered body of the present invention, are attached to a milling cutter holder for use in milling or to a holder for use in turning. The sialon sintered body of the present invention, having thermal shock resistance and VB wear resistance, is suitably employed in a cutting tool, particularly one for milling, and can be generally employed in rough machining to semi-finish machining.

The cutting insert 1 of the embodiment is formed of the sialon sintered body of the present invention. As described above, the cutting insert 1, formed of the aforementioned sialon sintered body, has thermal shock resistance and VB wear resistance. That is, the cutting insert 1 has a thermal shock resistance to such an extent that it is durable in rough machining of a work material (e.g., heat-resistant alloy), particularly in milling, and a VB wear resistance required for providing excellent finished surface through semi-finish machining, and can be generally employed in rough machining to semi-finish machining. The cutting insert 1 is suitably employed in cutting a work material. Examples of the work material include an Ni-based heat-resistant alloy (e.g., Inconel 718) and an Ni-based heat-resistant alloy containing ≥10 mass % Co (e.g., Waspaloy).

In another embodiment, the cutting insert of the present invention is formed of the aforementioned sialon sintered body, and a hard carbide, oxide, or nitride coating formed on at least a part of the peripheral surface of the sialon sintered body. Examples of the hard material typically employed include TiN, Ti(C,N), TiC, $Al_2O_3$, (Ti,Al)N, and (Ti,Si)N. When the aforementioned coating is formed on at least a part of the cutting edge of the cutting insert, the cutting edge exhibits further enhanced wear resistance, since the coating has low reactivity to the work material and has high hardness.

No particular limitation is imposed on the use of the sialon sintered body of the present invention. In addition to a cutting insert, the sintered body may be used as another cutting tool, a mechanical part, a heat-resistant part, a wear-resistant part, etc.

EXAMPLES (Production of Cutting Insert)

In each trial, $\alpha$-$Si_3N_4$ powder, $Al_2O_3$ powder, AlN powder, and a rare earth element oxide powder, each having a mean particle size of 1.0 μm or less, were mixed at proportions shown in TABLES 1 to 3, to thereby prepare a raw material powder. Notably, $\alpha$-$Si_3N_4$ powder was optionally subjected to an acid treatment with hydrofluoric acid, or a powder having low oxygen content was used. Subsequently, the thus-prepared raw material powder, a microwax-type organic binder dissolved in ethanol, and ethanol were put into a pot made of $Si_3N_4$, and the raw material powder was mixed under wet conditions by means of $Si_3N_4$ balls, to thereby prepare a slurry. The slurry was sufficiently dried and press-molded into a cutting insert defined by the ISO standard RNGN120700T01020. The thus-formed compact was dewaxed in a heater at 1 atm ($N_2$) and about 600° C. for 60 minutes. The thus-dewaxed compact was heated in a sagger made of $Si_3N_4$ under nitrogen at 1,850° C. for 240 minutes, to thereby obtain a sialon sintered body. In the case where the formed sialon sintered body had a theoretical density lower than 99%, the sialon sintered body was further subjected to an HIP process under nitrogen at 1,000 atm and 1,600° C. for 180 minutes, to thereby obtain a dense sintered body having a theoretical density of 99% or higher. The thus-formed sialon sintered body was polished with a diamond grinding wheel, to thereby form a shape defined by the ISO standard RNGN120700T01020. Thus, a cutting insert for a cutting tool was obtained.

TABLE 1

| TEST NO. | COMPOSITION (mol %) | | | | | | | | |
|---|---|---|---|---|---|---|---|---|---|
| | $Si_3N_4$ | $Al_2O_3$ | AlN | RARE EARTH OXIDE(S) | | | | | |
| 1 | 42.9 | 9.2 | 45.9 | $La_2O_3$ | 1.0 | $Y_2O_3$ | 1.0 | | |
| 2 | 44.6 | 12.5 | 42.0 | $La_2O_3$ | 0.45 | $Y_2O_3$ | 0.45 | | * |
| 3 | 53.4 | 9.0 | 35.8 | $La_2O_3$ | 0.9 | $Y_2O_3$ | 0.9 | | |
| 4 | 44.0 | 12.2 | 40.3 | $La_2O_3$ | 0.6 | $Y_2O_3$ | 2.9 | | * |
| 5 | 53.1 | 8.2 | 36.9 | $La_2O_3$ | 0.9 | $Y_2O_3$ | 0.9 | | * |
| 6 | 55.8 | 7.1 | 35.7 | $La_2O_3$ | 0.7 | $Y_2O_3$ | 0.7 | | |
| 7 | 55.8 | 7.1 | 35.7 | $La_2O_3$ | 0.7 | $Y_2O_3$ | 0.7 | | * |
| 8 | 55.2 | 6.2 | 37.2 | $La_2O_3$ | 0.7 | $Y_2O_3$ | 0.7 | | * |
| 9 | 55.2 | 6.2 | 37.2 | $La_2O_3$ | 0.7 | $Yb_2O_3$ | 0.7 | | * |
| 10 | 55.2 | 6.2 | 37.2 | $La_2O_3$ | 0.7 | $Nd_2O_3$ | 0.3 | $Gd_2O_3$ 0.4 | * |
| 11 | 55.2 | 6.2 | 37.2 | $La_2O_3$ | 0.7 | $Dy_2O_3$ | 0.7 | | * |
| 12 | 55.2 | 6.2 | 37.2 | $La_2O_3$ | 0.7 | $Sm_2O_3$ | 0.4 | $Eu_2O_3$ 0.3 | * |
| 13 | 55.2 | 6.2 | 37.2 | $La_2O_3$ | 0.7 | $Lu_2O_3$ | 0.3 | $Er_2O_3$ 0.4 | * |
| 14 | 55.2 | 6.2 | 37.2 | $La_2O_3$ | 0.9 | $Y_2O_3$ | 0.5 | | * |
| 15 | 54.9 | 5.5 | 38.4 | $La_2O_3$ | 1.1 | $Y_2O_3$ | 0.1 | | * |
| 16 | 52.7 | 6.6 | 38.9 | $La_2O_3$ | 0.9 | $Y_2O_3$ | 0.9 | | * |
| 17 | 42.9 | 9.2 | 45.7 | $CeO_2$ | 1.1 | $Y_2O_3$ | 1.1 | | |
| 18 | 27.3 | 10.9 | 59.8 | $La_2O_3$ | 1.0 | $Y_2O_3$ | 1.0 | | |
| 19 | 27.3 | 10.9 | 59.8 | $La_2O_3$ | 1.0 | $Y_2O_3$ | 1.0 | | * |
| 20 | 27.3 | 10.9 | 59.8 | $La_2O_3$ | 2.0 | | | | * |
| 21 | 27.3 | 10.9 | 59.8 | $Y_2O_3$ | 2.0 | | | | |
| 22 | 42.9 | 9.0 | 45.9 | $La_2O_3$ | 1.1 | $Y_2O_3$ | 1.1 | | |
| 23 | 72.8 | 6.2 | 18.4 | $Yb_2O_3$ | 2.6 | | | | |
| 24 | 43.3 | 12.3 | 40.2 | $La_2O_3$ | 2.5 | $Y_2O_3$ | 1.7 | | |
| 25 | 80.8 | 1.6 | 14.2 | $Y_2O_3$ | 3.4 | | | | |
| 26 | 58.1 | 16.4 | 24.9 | $La_2O_3$ | 0.3 | $Y_2O_3$ | 0.3 | | |
| 27 | 42.8 | 9.1 | 46.0 | $La_2O_3$ | 2.0 | $Y_2O_3$ | 0.1 | | |
| 28 | 42.3 | 9.0 | 45.4 | $La_2O_3$ | 0.5 | $Y_2O_3$ | 2.8 | | |
| 29 | 58.4 | 9.3 | 30.3 | $La_2O_3$ | 1.0 | $Y_2O_3$ | 1.0 | | |
| 30 | 46.6 | 8.4 | 43.2 | $La_2O_3$ | 0.9 | $Y_2O_3$ | 0.9 | | |

*USE OF LOW-OXYGEN OR ACID-TREATED SILICON NITRIDE POWDER

TABLE 2

| TEST NO. | COMPOSITION (mol %) | | | | | | | |
|---|---|---|---|---|---|---|---|---|
| | $Si_3N_4$ | $Al_2O_3$ | AlN | RARE EARTH OXIDE(S) | | | | |
| A | 55.0 | 7.0 | 36.0 | $La_2O_3$ | 1.0 | $Y_2O_3$ | 1.0 | * |
| B | 43.8 | 11.7 | 42.5 | $La_2O_3$ | 1.0 | $Y_2O_3$ | 1.0 | * |
| C | 61.1 | 8.8 | 28.1 | $La_2O_3$ | 1.0 | $Y_2O_3$ | 1.0 | * |
| D | 42.0 | 11.6 | 44.4 | $La_2O_3$ | 1.0 | $Y_2O_3$ | 1.0 | * |
| E | 71.0 | 6.2 | 20.8 | $La_2O_3$ | 1.0 | $Y_2O_3$ | 1.0 | * |

*USE OF LOW-OXYGEN OR ACID-TREATED SILICON NITRIDE POWDER

TABLE 3

| TEST NO. | Si$_3$N$_4$ | Al$_2$O$_3$ | AlN | RARE EARTH OXIDE(S) | | | | |
|---|---|---|---|---|---|---|---|---|
| i | 55.0 | 7.0 | 36.0 | La$_2$O$_3$ | 1.0 | Y$_2$O$_3$ | 1.0 | * |
| ii | 44.0 | 12.2 | 40.3 | La$_2$O$_3$ | 0.6 | Y$_2$O$_3$ | 2.9 | * |
| iii | 54.9 | 5.5 | 38.4 | La$_2$O$_3$ | 1.1 | Y$_2$O$_3$ | 0.1 | * |
| iv | 58.1 | 16.4 | 24.9 | La$_2$O$_3$ | 2.0 | Y$_2$O$_3$ | 0.1 | * |
| v | 42.8 | 9.1 | 46.0 | La$_2$O$_3$ | 0.5 | Y$_2$O$_3$ | 2.8 | * |

COMPOSITION (mol %)

*USE OF LOW-OXYGEN OR ACID-TREATED SILICON NITRIDE POWDER (Analysis of Cutting Inserts)

The thus-produced sialon sintered bodies were analyzed. TABLES 4 to 6 show the results.

The sialon species contained in each sialon sintered body was identified by using X-ray diffractometry of the sialon sintered body.

Each sialon sintered body was cut, and the cut surface was mirror-polished. The mirror-polished cut surface was observed with a scanning electron microscope. In each sialon sintered body, an amorphous grain boundary phase partially containing crystals between crystal grains was observed. A photograph taken by the scanning electron microscope was analyzed, whereby the areas attributed to sialon species were isolated from the phase other than those. The area of each of the two portions was measured. The relative sialon-related in the entire photograph area were measured In the cases of test numbers 4, 24, 25, and 28, the relative area was 70 to 85 area %. In the cases of test numbers 1, 3, 5 to 23, 27, 29, and 30, the relative area was 85 to 95 area %. In the cases of test numbers 2 and 26, the relative area was 95 to 99 area %.

The Z value of β-sialon was measured by using X-ray diffractometry of the sialon sintered body and calculation by the aforementioned formula (1).

The 21R-sialon content, the total poly-type sialon content, and the α-sialon content were measured by using X-ray diffractometry of the sialon sintered body. Specifically, the ratio of 21R-sialon peak intensity ($I_{21R}$) to total sialon peak intensity ($I_A$) [($I_{21R}/I_A$)×100], the ratio of total poly-type sialon peak intensity ($I_P$) to total sialon peak intensity ($I_A$) [($I_P/I_A$)×100], and the ratio of α-sialon peak intensity ($I_\alpha$) to total sialon peak intensity ($I_A$) [($I_\alpha/I_A$)×100] were calculated.

The thermal expansion coefficient of each of the produced sialon sintered bodies in a range of room temperature (25° C.) to 600° was measured under nitrogen atmosphere at temperature elevation rate of 10° C./min, in accordance with JIS R 1618.

The rare earth element B content and the rare earth element C content of each of the produced sialon sintered bodies were measured by using X-ray fluorometry.

The rare earth element B content and the rare earth element C content of α-sialon were measured by means of an element analyzer (EDS) attached to a transmission electron microscope. Specifically, 5 or more α-sialon particles were subjected to EDS analysis, and the measurements were averaged.

The thermal conductivity of each of the produced sialon sintered bodies was measured at room temperature (25° C.) in accordance with JIS R 1611. In the cases of test numbers 1 to 23, 25, 29, and 30, the thermal conductivity was 7 W/k·m or higher. In the cases of test numbers 24, and 26 to 28, the thermal conductivity was lower than 7 W/k·m.

(Evaluation of Cutting Performance of Cutting Inserts)

In each trial, a plurality of cutting inserts made of the same sintered body were attached to a milling cutter holder shown in FIG. 2. A cutting test was performed under the following cutting conditions. In the cutting procedure, the cutting distance of each cutting insert when any of the states (1) and (2) was observed is shown in TABLES 4 to 6.

(1) VB wear exceeded 0.3 mm (VB)
(2) Breakage occurred due to thermal cracking caused by poor thermal shock resistance (TC)

[Cutting Conditions 1]
Work material: Inconel 718
Cutting speed: 1,000 m/min
Feed speed: 0.2 mm/tooth
Depth of cut: 1 mm
Cutting oil: none

[Cutting Conditions 2]
Work material: Inconel 718
Cutting speed: 1,200 m/min
Feed speed: 0.17 mm/tooth
Depth of cut: 1 mm
Cutting oil: none

TABLE 4

| TEST NO. | β-SIALON Z VALUE | 21R-SIALON CONTENT (%) | THERMAL EXPANSION COEFF. ppm/K | POLY-TYPE SIALONS CONTENT (%) | POLY-TYPE SIALONS TYPE | POLY-TYPE SIALON TOTAL CONTENT (%) | RARE EARTH ELEMENTS AS OXIDE $M_B$ (mol %) | RARE EARTH ELEMENTS AS OXIDE $M_C$ (mol %) |
|---|---|---|---|---|---|---|---|---|
| 1 | 0.6 | 28 | 4.0 | 8 | 12H | 36 | 1.0 | 1.0 |
| 2 | 1.0 | 18 | 3.9 | 0 | — | 18 | 0.45 | 0.45 |
| 3 | 0.6 | 6 | 3.6 | 10 | 12H | 16 | 0.9 | 0.9 |
| 4 | 0.9 | 15 | 3.8 | 0 | — | 15 | 0.6 | 2.9 |
| 5 | 0.8 | 13 | 3.8 | 5 | 15H | 18 | 0.9 | 0.9 |
| 6 | 0.5 | 15 | 3.6 | 0 | — | 15 | 0.7 | 0.7 |
| 7 | 0.5 | 8 | 3.6 | 10 | 12H, 15R | 18 | 0.7 | 0.7 |
| 8 | 0.4 | 20 | 3.6 | 0 | — | 20 | 0.7 | 0.7 |
| 9 | 0.4 | 19 | 3.6 | 0 | — | 19 | 0.7 | 0.7 |
| 10 | 0.3 | 25 | 3.7 | 0 | — | 25 | 0.7 | 0.7 |
| 11 | 0.4 | 20 | 3.6 | 0 | — | 20 | 0.7 | 0.7 |
| 12 | 0.3 | 22 | 3.6 | 0 | — | 22 | 0.7 | 0.7 |
| 13 | 0.3 | 22 | 3.6 | 0 | — | 22 | 0.7 | 0.7 |
| 14 | 0.4 | 15 | 3.5 | 0 | — | 15 | 0.9 | 0.5 |
| 15 | 0.5 | 16 | 3.6 | 0 | — | 16 | 1.1 | 0.1 |
| 16 | 0.4 | 25 | 3.7 | 0 | — | 25 | 0.9 | 0.9 |
| 17 | 0.6 | 0 | 3.8 | 25 | 12H | 25 | 1.1 | 1.1 |

TABLE 4-continued

| | | | | | | | | |
|---|---|---|---|---|---|---|---|---|
| 18 | 0.7 | 20 | 4.0 | 27 | 12H | 47 | 1.0 | 1.0 |
| 19 | 1.0 | 35 | 4.1 | 15 | 12H | 51 | 1.0 | 1.0 |
| 20 | 0.7 | 59 | 4.7 | 0 | — | 59 | 2.0 | 0.0 |
| 21 | 0.9 | 2 | 4.5 | 40 | 12H | 42 | 0.0 | 2.0 |
| 22 | 0.6 | 0 | 3.7 | 20 | 12H | 20 | 1.1 | 1.1 |
| 23 | 0.6 | 0 | 3.3 | 0 | — | 0 | 0.0 | 2.6 |
| 24 | 1.1 | 10 | 4.3 | 0 | — | 10 | 2.5 | 1.7 |
| 25 | 0.26 | 0 | 3.1 | 0 | — | 0 | 0.0 | 3.4 |
| 26 | 0.9 | 13 | 3.7 | 0 | — | 13 | 0.3 | 0.3 |
| 27 | 0.8 | 18 | 3.8 | 0 | — | 18 | 2.0 | 0.1 |
| 28 | 0.9 | 10 | 3.7 | 0 | — | 10 | 0.5 | 2.8 |
| 29 | 0.6 | 4 | 3.6 | 8 | 12H | 12 | 1.0 | 1.0 |
| 30 | 0.6 | 28 | 3.9 | 5 | 12H | 33 | 0.9 | 0.9 |

| | RARE EARTH ELEMENTS | | | α-SIALON | | | TEST RESULTS CUTTING TEST 1 | |
|---|---|---|---|---|---|---|---|---|
| | AS OXIDE | | | | RARE EARTH ELEMENTS | | | |
| TEST NO. | $M_B + M_C$ (mol %) | $M_B:M_C$ MOLE RATIO | $A_S:A_C$ ATOMIC RATIO | CONTENT (%) | $A_S:A_C$ ATOMIC RATIO | $A_\alpha/A_S$ (%) | WORK-ABLE TIME (sec) | DAMAGED BY |
| 1 | 2 | 1:1 | 1:1 | 4 | 0.5:1 | 50 | 130 | TC |
| 2 | 0.9 | 1:1 | 1:1 | 0 | — | — | 110 | TC |
| 3 | 1.8 | 1:1 | 1:1 | 18 | 0.5:1 | 50 | 130 | TC |
| 4 | 3.5 | 1:4.8 | 1:4.8 | 22 | 0.1:1 | 48 | 120 | TC |
| 5 | 1.8 | 1:1 | 1:1 | 4 | 0.6:1 | 60 | 150 | TC |
| 6 | 1.4 | 1:1 | 1:1 | 5 | 0.7:1 | 65 | 170 | TC |
| 7 | 1.4 | 1:1 | 1:1 | 3 | 0.2:1 | 20 | 160 | TC |
| 8 | 1.4 | 1:1 | 1:1 | 10 | 0.4:1 | 40 | 150 | TC |
| 9 | 1.4 | 1:1 | 1:1 | 12 | 0.5:1 | 50 | 160 | TC |
| 10 | 1.4 | 1:1 | 1:1 | 7 | 0.5:1 | 50 | 170 | TC |
| 11 | 1.4 | 1:1 | 1:1 | 8 | 0.3:1 | 30 | 150 | TC |
| 12 | 1.4 | 1:1 | 1:1 | 14 | 0.6:1 | 60 | 130 | VB |
| 13 | 1.4 | 1:1 | 1:1 | 10 | 0.45:1 | 45 | 140 | VB |
| 14 | 1.4 | 1:1 | 1:1 | 3 | 0.5:1 | 50 | 150 | TC |
| 15 | 1.2 | 1:0.09 | 1:0.09 | 15 | 3:1 | 27 | 140 | TC |
| 16 | 1.8 | 1:1 | 1:1 | 3 | 0.6:1 | 60 | 150 | TC |
| 17 | 2.2 | 1:1 | 1:2 | 0 | — | — | 40 | TC |
| 18 | 2.0 | 1:1 | 1:1 | 4 | 0.3:1 | 30 | 110 | TC |
| 19 | 2.0 | 1:1 | 1:1 | 0 | — | — | 60 | TC |
| 20 | 2.0 | 1:0 | 1:0 | 0 | — | — | 30 | TC |
| 21 | 2.0 | 0:1 | 0:1 | 29 | 0:1 | — | 30 | TC |
| 22 | 2.2 | 1:1 | 1:1 | 0 | — | — | 50 | TC |
| 23 | 2.6 | 1:1 | 1:1 | 17 | 0:1 | — | 50 | VB |
| 24 | 4.2 | 1:0.7 | 1:0.7 | 0 | — | — | 80 | TC |
| 25 | 3.4 | 0:1 | 0:1 | 15 | 0:1 | — | 30 | VB |
| 26 | 0.6 | 1:1 | 1:1 | 0 | — | — | 90 | TC |
| 27 | 2.1 | 1:0.05 | 1:0.05 | 0 | — | — | 100 | TC |
| 28 | 3.3 | 1:5.6 | 1:5.6 | 18 | 0.9:1 | — | 100 | TC |
| 29 | 2.0 | 1:1 | 1:1 | 2 | — | — | 60 | TC |
| 30 | 1.8 | 1:1 | 1:1 | 8 | 0.75:1 | 75 | 100 | TC |

TABLE 5

| | β-SIALON | 21R-SIALON | THERMAL EXPANSION | POLY-TYPE SIALONS | | POLY-TYPE SIALON TOTAL | RARE EARTH ELEMENTS AS OXIDE | |
|---|---|---|---|---|---|---|---|---|
| TEST NO. | Z VALUE | CONTENT (%) | COEFF. ppm/K | CONTENT (%) | TYPE | CONTENT (%) | $M_B$ (mol %) | $M_C$ (mol %) |
| A | 0.6 | 18 | 3.7 | 0 | — | 18 | 1.0 | 1.0 |
| B | 1.0 | 16 | 3.8 | 0 | — | 16 | 1.0 | 1.0 |
| C | 0.4 | 20 | 3.6 | 0 | — | 20 | 1.0 | 1.0 |
| D | 1.1 | 17 | 3.9 | 0 | — | 17 | 1.0 | 1.0 |
| E | 0.2 | 16 | 3.4 | 0 | — | 16 | 1.0 | 1.0 |

TABLE 5-continued

| | | | | α-SIALON | | | TEST RESULTS | |
| --- | --- | --- | --- | --- | --- | --- | --- | --- |
| | RARE EARTH ELEMENTS | | | RARE EARTH | | | CUTTING TEST 1 | |
| | AS OXIDE | | | ELEMENTS | | | WORK- | |
| TEST NO. | $M_B + M_C$ (mol %) | $M_B:M_C$ MOLE RATIO | $A_S:A_C$ ATOMIC RATIO | CONTENT (%) | $A_S:A_C$ ATOMIC RATIO | $A_\alpha/A_S$ (%) | ABLE TIME (sec) | DAMAGED BY |
| A | 2.0 | 1:1 | 1:1 | 0 | — | — | 100 | TC |
| B | 2.0 | 1:1 | 1:1 | 0 | — | — | 80 | TC |
| C | 2.0 | 1:1 | 1:1 | 0 | — | — | 80 | TC |
| D | 2.0 | 1:1 | 1:1 | 0 | — | — | 50 | TC |
| E | 2.0 | 1:1 | 1:1 | 0 | — | — | 20 | VB |

TABLE 6

| | β-SIALON | 21R-SIALON | THERMAL EXPANSION | POLY-TYPE SIALONS | | POLY-TYPE SIALON TOTAL | RARE EARTH ELEMENTS AS OXIDE | |
| --- | --- | --- | --- | --- | --- | --- | --- | --- |
| TEST NO. | Z VALUE | CONTENT (%) | COEFF. ppm/K | CONTENT (%) | TYPE | CONTENT (%) | $M_B$ (mol %) | $M_C$ (mol %) |
| i | 0.6 | 18 | 3.7 | 0 | — | 18 | 1.0 | 1.0 |
| ii | 0.9 | 15 | 3.8 | 0 | — | 15 | 0.6 | 2.9 |
| iii | 0.5 | 16 | 3.6 | 0 | — | 16 | 1.1 | 0.1 |
| iv | 0.8 | 18 | 3.8 | 0 | — | 18 | 2.0 | 0.1 |
| v | 0.9 | 10 | 3.7 | 0 | — | 10 | 0.5 | 2.8 |

| | | | | α-SIALON | | | TEST RESULTS | |
| --- | --- | --- | --- | --- | --- | --- | --- | --- |
| | RARE EARTH ELEMENTS | | | RARE EARTH | | | CUTTING TEST 1 | |
| | AS OXIDE | | | ELEMENTS | | | WORK- | |
| TEST NO. | $M_B + M_C$ (mol %) | $M_B:M_C$ MOLE RATIO | $A_S:A_C$ ATOMIC RATIO | CONTENT (%) | $A_S:A_C$ ATOMIC RATIO | $A_\alpha/A_S$ (%) | ABLE TIME (sec) | DAMAGED BY |
| i | 2.0 | 1:1 | 1:1 | 0 | — | — | 100 | TC |
| ii | 3.5 | 1:4.8 | 1:4.8 | 22 | 0.1:1 | 48 | 75 | TC |
| iii | 1.2 | 1:0.09 | 1:0.09 | 15 | 3:1 | 27 | 80 | TC |
| iv | 2.1 | 1:0.05 | 1:0.05 | 0 | — | — | 50 | TC |
| v | 3.3 | 1:5.6 | 1:5.6 | 18 | 0.9:1 | — | 50 | TC |

As shown in TABLES 4 to 6, the cutting inserts falling within the scope of the present invention exhibited a long machinable time in cutting until VB wear exceeded 0.3 mm or breakage occurred due to thermal cracking caused by poor thermal shock resistance. That is, the cutting inserts of the present invention were found to have VB wear resistance and thermal shock resistance. Thus, the cutting inserts of the present invention can be employed in both rough machining and semi-finish machining of a heat-resistant alloy (e.g., Inconel 718) as a work material. In contrast, the cutting inserts falling outside the scope of the present invention exhibited a short machinable time in cutting until VB wear exceeded 0.3 mm or breakage occurred due to thermal cracking caused by poor thermal shock resistance. That is, at least one of VB wear resistance and thermal shock resistance is unsatisfactory.

The test results shown in TABLES 4 to 6 will be described in more detail.

As shown in TABLE 4, the cutting inserts of test numbers 17, 21 to 23, 25, and 29, each having a 21R-sialon content lower than 5%, exhibited a shorter machinable time, as compared with the cutting inserts falling within the scope of the present invention. The aforementioned cutting inserts were damaged by VB wear or breakages due to poor thermal shock resistance. Thus, when the 21R-sialon content is lower than 5%, VB wear resistance or thermal shock resistance is poor.

As shown in TABLE 4, the cutting inserts of test numbers 19 and 20, each having a 21R-sialon content 30% or higher, exhibited a shorter machinable time, as compared with the cutting inserts falling within the scope of the present invention. The aforementioned cutting inserts were damaged by breakages due to poor thermal shock resistance. Thus, when the 21R-sialon content is 30% or higher, thermal shock resistance is poor.

As shown in TABLE 4, the cutting inserts of test numbers 20, 21, and 24, each having a thermal expansion coefficient greater than 4.2 ppm/K, exhibited a shorter machinable time, as compared with the cutting inserts of test numbers of 1 to 16, 18, 26 to 28, and 30. The aforementioned cutting inserts were damaged by breakages due to poor thermal shock resistance. Thus, when the thermal expansion coefficient is greater than 4.2 ppm/K, thermal shock resistance tends to be poor.

As shown in TABLE 4, the cutting insert of test number 19, containing 21R-sialon and poly-type sialon species other than 21R-sialon with a total content being greater than 50%, exhibited a shorter machinable time, as compared with the cutting inserts of test numbers 1 to 16, 18, 26 to 28, and 30. The aforementioned cutting insert was damaged by breakages due to poor thermal shock resistance. Thus, when the poly-type sialon total content is greater than 50%, thermal shock resistance tends to be poor.

As shown in TABLE 4, the cutting insert of test number 21, having an α-sialon content greater than 25%, exhibited a shorter machinable time, as compared with the cutting inserts of test numbers 1 to 16, 18, 26 to 28, and 30. The aforementioned cutting insert was damaged by breakages due to poor thermal shock resistance. Thus, when the α-sialon content is greater than 25%, thermal shock resistance tends to be poor.

As shown in TABLE 4, the cutting insert of test number 30, containing α-sialon and having a ratio $A_\alpha/A_S$ greater than 70%, exhibited a shorter machinable time, as compared with the cutting inserts of test numbers 1, 3 to 16, and 18. The cutting insert of test number 30 was damaged by breakages due to poor breakage resistance. Thus, when the ratio $A_\alpha/A_S$ is in excess of 70%, thermal shock resistance tends to be poor.

As shown in TABLE 5, the cutting insert of test number E, having a Z value of β-sialon smaller than 0.3, exhibited a shorter machinable time, as compared with the cutting inserts of test numbers A to C. The cutting insert of test number E was damaged by VB wear. Thus, when the Z value of β-sialon is smaller than 0.3, VB wear resistance tends to be poor.

As shown in TABLE 5, the cutting insert of test number D, having a Z value of β-sialon greater than 1.0, exhibited a shorter machinable time, as compared with the cutting inserts of test numbers A to C. The cutting insert of test number D was damaged by breakages due to poor thermal shock resistance. Thus, when the Z value of β-sialon is greater than 1.0, thermal shock resistance tends to be poor.

As shown in TABLE 6, the cutting insert of test number iv, containing rare earth elements B and C and having a mole ratio $M_C/M_B$ smaller than 0.06, exhibited a shorter machinable time, as compared with the cutting inserts of test numbers i to iii. The cutting insert of test number iv was damaged by breakages due to poor thermal shock resistance. Thus, when the mole ratio $M_C/M_B$ is smaller than 0.06, thermal shock resistance tends to be poor.

As shown in TABLE 6, the cutting insert of test number v, having a mole ratio $M_C/M_B$ greater than 5.0, exhibited a shorter machinable time, as compared with the cutting inserts of test numbers i to iii. The cutting insert of test number v was damaged by breakages due to poor thermal shock resistance. Thus, when the mole ratio $M_C/M_B$ is greater than 5.0, thermal shock resistance tends to be poor.

As shown in TABLE 4, the cutting insert of test number 26, containing the rare earth element B and the rare earth element C in a total amount smaller than 0.8 mol %, exhibited a shorter machinable time, as compared with the cutting inserts of test numbers 1 to 16, 18, 27, 28, and 30. The cutting insert of test number 26 was damaged by breakages due to poor thermal shock resistance. Thus, when the total amount of rare earth elements B and C is smaller than 0.8 mol %, thermal shock resistance tends to be poor.

As shown in TABLE 4, the cutting insert of test number 24, containing the rare earth element B and the rare earth element C in a total amount greater than 4.0 mol %, exhibited a shorter machinable time, as compared with the cutting inserts of test numbers 1 to 16, 18, 26 to 28, and 30. The cutting insert of test number 24 was damaged by breakages due to poor thermal shock resistance. Thus, when the total amount of rare earth elements B and C is in excess of 4.0 mol %, thermal shock resistance tends to be poor.

DESCRIPTION OF REFERENCE NUMERALS

1: cutting insert
10: cutting tool
11: milling cutter holder
12: attaching portion

The invention claimed is:

1. A sialon sintered body containing β-sialon and 21R-sialon, characterized in that the sialon sintered body exhibits an X-ray diffraction peak intensity ratio $[(I_{21R}/I_A)\times 100]$ of 5% or greater and smaller than 30%, wherein $I_A$ represents the sum of the peak intensities of the sialon species, and $I_{21R}$ represents the peak intensity of 21R-sialon, the ratio being calculated from the peak intensities of the sialon species obtained by using X-ray diffractometry; the sialon sintered body has a thermal expansion coefficient of 4.2 ppm/K or less in a range of room temperature to 600° C.; and
β-sialon represented by $Si_{6-Z}Al_ZO_ZN_{8-Z}$ has a Z value of 0.3 to 1.0.

2. A sialon sintered body according to claim 1, wherein the sintered body contains at least one rare earth element B selected from the group consisting of La and Ce, and at least one rare earth element C selected from the group consisting of Y, Nd, Sm, Eu, Gd, Dy, Er, Yb, and Lu;
the mole ratio of rare earth element B to rare earth element C as oxides, $M_B:M_C$, is 1.0:0.06 to 1.0:5.0; and
the sialon sintered body contains the rare earth element B and the rare earth element C in a total amount, as oxides, of 0.8 mol % to 4.0 mol %.

3. A sialon sintered body according to claim 1, which exhibits an X-ray diffraction peak intensity ratio $[(I_\alpha/I_A)\times 100]$ of 0% to 25%, wherein $I_A$ represents the sum of the peak intensities of the sialon species, and $I_\alpha$ represents the peak intensity of α-sialon, the peak intensities of the sialon species being obtained by using X-ray diffractometry.

4. A sialon sintered body according to claim 3, wherein in α-sialon represented by $M_x(Si,Al)_{12}(O,N)_{16}$ ($0<x\leq 2$), M represents metallic elements including the rare earth element B selected from the group consisting of La and Ce and the rare earth element C selected from the group consisting of Y, Nd, Sm, Eu, Gd, Dy, Er, Yb, and Lu;
the sialon sintered body has a ratio $A_\alpha/A_S$ of 70% or smaller, wherein $A_S$ represents the atomic ratio of rare earth element B to rare earth element C, and $A_\alpha$ represents the atomic ratio of rare earth element B to rare earth element C in α-sialon; and
the sialon sintered body exhibits an x-ray diffraction peak intensity ratio $[(I_\alpha/I_a)\times 100]$ of 3% to 25%.

5. A sialon sintered body according to claim 1, wherein the sialon sintered body contains 21R-sialon, and at least one of 12H-sialon and 15R-sialon among polysialon species including 21R-sialon, 12H-sialon, and 15R-sialon, and
the sialon sintered body exhibits an X-ray diffraction peak intensity ratio $[(I_p/I_A)\times 100]$ of 50% or smaller, wherein $I_A$ represents the sum of the peak intensities of the sialon species, the peak intensities of the sialon species being obtained by using X-ray diffractometry, and $I_p$ represents the sum of the peak intensities of poly-type sialon species, the peak intensities of the poly-sialon species being obtained by using X-ray diffractometry.

6. A cutting insert formed of a sialon sintered body as recited in claim 1.

* * * * *